Patented Feb. 5, 1952

2,584,112

UNITED STATES PATENT OFFICE 2,584,112

ORGANIC PHOSPHINES

Herbert C. Brown, West Lafayette, Ind., assignor to Standard Oil Company, Chicago, Ill., a corporation of Indiana No Drawing. Application August 30, 1950,
Serial No. 182,413

19 Claims. (Cl. 260—607)

This invention relates to a process for the production of organic phosphines. More particularly, this invention relates to the acid-catalyzed reaction of an olefin with phosphine to produce an organic phosphine, and to novel t-alkyl phosphines which have been produced by the application of said reaction to certain tertiary olefins.

Organic P-chloro compounds have been produced by the reaction of olefins with phosphorus trichloride in the presence of peroxide catalysts. However, the corresponding organic phosphines have heretofore been prepared by difficult, laborious and expensive methods. This is especially true as to monoalkylphosphines, which have heretofore been prepared by such methods as the reaction of an alkyl iodide with phosphonium iodide in the presence of zinc oxide; by the reaction of white phosphorus with ethanol; by the reaction of sodium phosphide with ethyl bromide, etc. The employment of these methods leads to the production of considerable proportions of di- and tri-alkyl phosphines in addition to the desired mono-alkyl phosphine. A. W. Hofmann's study (Ber. 4, 372–8 (1871)) of the reaction of ethanol with phosphonium iodide in various proportions led only to the production of triethylphosphine.

It is an object of the present invention to provide a novel and useful process for the preparation of organic phosphines. Another object of this invention is to provide a novel process for the preparation of hydrocarbon phosphines. An additional object of this invention is to provide a process for the preparation of saturated hydrocarbon phosphines, particularly phosphines having the general formula $RPH_2$ wherein R is an alkyl or cycloalkyl radical. Still another object of this invention is to provide a process for the preparation of mono-t-alkylphosphines. Yet another object of the invention is to provide a novel process for the separation of secondary and tertiary olefins, wherein the tertiary olefins are selectively reacted with phosphine in the presence of a strong non-oxidizing acid catalyst to produce a t-alkylphosphine which can be separated from unreacted secondary olefins. Yet another object of this invention is to provide the art with certain new organic compounds, viz., mono-t-alkylphosphines, and the phosphinic and phosphonic acids which can be derived by the oxidation thereof. These and other objects of my invention will become apparent from the ensuing description thereof.

Briefly, I have discovered a general and facile reaction for the preparation of organic phosphines, particularly mono- and di-phosphines having the general formula $RPH_2$ and $R_1R_2PH$, respectively, wherein R, $R_1$ and $R_2$ are organic radicals, such as saturated hydrocarbon groups. In accordance with my invention, an olefinic compound, such as an olefinic hydrocarbon, is reacted with phosphine in the presence of a strong non-oxidizing acid catalyst. A wide variety of olefinic hydrocarbons and substitution products thereof are available for use in the present invention, as will appear in more detail hereinafter. A wide variety of strong, non-oxidizing acid catalysts may be employed in effecting the novel process of the present invention. By a non-oxiding acid I intend to denote an acid which does not oxidize phosphine substantially under the reaction conditions. Concentrated sulfuric acid is an oxidizing acid for the purposes of the present invention, since, as will appear in more detail hereinafter, phosphine is oxidized thereby and becomes unavailable for reaction with the olefinic compound. In general, it is preferable to use as strong an acid as possible, for example, non-oxidizing acids having a strength approaching that of a mineral acid, e. g., liquid substantially anhydrous hydrogen fluoride, although, as will appear from the operating examples herein, far weaker acids than liquid HF can be employed although the yields of reaction products under comparable conditions are somewhat reduced. Details of suitable charging stocks, catalyst, operating variables and results obtained by the actual practice of the present invention are set forth hereinafter.

The process of the present invention can be applied to diverse types of organic compounds containing olefinic unsaturation. Thus, the invention may be practiced with olefinic hydrocarbons, for example, with ethylene (which is the sole primary olefin), with secondary olefins, such as propylene, 1- and 2-butenes; higher secondary olefins such as secondary pentenes, hexenes, octenes, decenes, dodecenes, cetenes and the like; tertiary olefins, such as isobutylene, 2-ethyl-1-hexene, diisobutylene, isobutylene-n-butylene codimers, certain higher molecular weight polybutylenes and polypropylenes, such as propylene tetramers, etc.; aromatic-substituted acyclic olefins such as styrene, alpha-methyl styrene, alpha- or beta-vinylnaphthalene; vinyl acetylene; conjugated and unconjugated polyolefins, for example, 1,3-butadiene, isoprene, 2,3-dimethyl-1,3-butadiene, cyclopentadiene, dicyclopentadiene, 1,4 - pentadiene, 2 - methyl-1,4-pentadiene, 3-vinylcyclohexene (cyclic dimer of 1,3-butadiene), alloocimene, divinylbenzenes; limonene, pinene, carene and other terpenes; other cycloolefins such as cyclopentene, methylcyclopentenes, cyclohexene, methylcyclohexenes, 1,3-cyclohexadiene and the like.

A variety of substituted olefins may also be employed in practicing this invention, for example, nuclearly chlorinated styrenes, vinyl heterocyclic compounds such as 2-vinylthiophene, 2-vinylfuran, 2-vinylpyridine, N-vinylcarbazole; allyl chloride, methallyl chloride, vinyl acetate, isopropenyl acetate, methyl oleate, methyl acrylate, methyl methacrylate, methyl vinyl ketone and the like. It should be understood that the suggestion of various specific olefins herein is not intended to function expressly or impliedly for the exclusion of others.

It should also be understood that it is not essential to employ pure olefinic materials for the practice of the present invention. Thus, it will be apparent that mixtures of olefins can be used and, as will appear hereinafter, actually have been used in the practice of the process of the present invention. This invention may readily be practiced with olefins such as are normally produced in the operation of carbon monoxide reduction plants, especially those employing iron catalysts, in the operation of petroleum refineries, etc., which produce olefins in admixture with saturated hydrocarbons, which function merely as inert diluents for the present purpose.

As catalysts for the novel process of the present invention I can employ a considerable variety of non-oxidizing strongly acidic materials. As has been pointed out above, for present purposes a non-oxidizing acid is one which will not oxidize phosphine substantially under the reaction conditions. Thus, I can employ non-oxidizing strong inorganic acids, for example such acids as liquid, substantially anhydrous hydrogen fluoride, hydrogen bromide, hydrochloric acid, mono- and difluorophosphoric acids, concentrated phosphoric acid, tetraphosphoric acid, halogensulfonic acids such as chloro- or fluosulfonic acids, dihydroxyfluoboric acid and the like.

This invention can be practiced by the employment of non-oxidizing strong organic acid catalysts. For example, I can employ organic sulfonic acids, particularly hydrocarbon sulfonic acids, such as alkanesulfonic or arylsulfonic acids. Trifluoroacetic acid and trichloroacetic acid are organic acids which approach the strength of mineral acids, and can be employed in practicing my invention. Alkanephosphinic acids and alkanephosphonic acids have been employed as catalysts in my invention.

Strongly acidic salts or complex compounds which do not react with phosphine can be employed as catalysts for the process of the present invention. Particularly applicable are $BF_3$ and $BF_3$ complex compounds, which are well-known in the art of hydrocarbon catalysis. Thus, I may employ complexes of $BF_3$ with oxygenated organic compounds, which complexes may be associated with free or uncomplexed $BF_3$, for the present purposes. Specific examples of organic oxygenated compounds which can be employed for forming the boron fluoride complexes are the following:

Methyl ether
Ethyl ether
Propyl ether
Butyl ether
Amyl ether
Phenol
Methyl ethyl ether
Methyl acetate
Ethyl acetate
Propyl acetate
Amyl acetate
Methanesulfonic acid
Ethanesulfonic acid
Benzenesulfonic acid
Toluenesulfonic acid
Dihydroxyfluoboric acid
Methyl formate
Ethyl formate
Butyl formate
Ethyl propionate
Acetic acid
Formic acid
Propionic acid
Anisole
Pyran
Tetra and penta-methylene oxides
Acetaldehyde
Acetone and the halogenated, preferably chlorinated, derivatives of the above, as for example B,B'-dichloroethyl ether (Chlorex), chloracetic acid, etc. Boron trifluoride may also be employed as $BF_3$ hydrates, as $BF_3$ complexes with alkyl sulfides, benzonitrile and similar compounds. Boron trifluoride may also be employed in the form of its adsorbate on an activated charcoal, for example an activated beechwood or coconut charcoal. Aluminum halides react with phosphine to form aluminum phosphide.

As will appear hereinafter, I have also employed complex solid aluminosilicic acids (which are relatively weak acids) and have found that they catalyze the reaction of an olefin with phosphine, although the reaction rate and yield are greatly reduced as compared with the rates and yields obtained through the use of strong acid catalysts, such as liquid hydrogen fluoride.

The various strong, non-oxidizing acid catalysts are not precisely equivalent in their effects, as will be specifically illustrated hereinafter. However, they are all available for the purposes of the present invention and the choice of catalyst in a specific instance can be readily made in the light of ordinary commercial and chemical engineering considerations.

Phosphine, $PH_3$, is a thermally stable gas which in certain concentrations in air will inflame spontaneously. It boils at $-87.4°$ C., has a critical temperature of $51°$ C., critical pressure of 64 atmospheres, is soluble to the extent of 1 volume of gas per 4 volumes of water at $17°$ C., and has relatively low solubility in hydrocarbons at low pressures. For example, about 0.7 g. of phosphine is soluble in 100 ml. of n-heptane at $30°$ C. and atmospheric pressure.

The specific methods which are available for the preparation of phosphine do not form a part of the present invention and, therefore, need not be detailed herein.

In general, the rate of reaction of an olefinic compound with phosphine increases with increasing phosphine concentration in the reaction zone. Also, it will be apparent that the conversion achieved in any given operation will depend upon the amount of phosphine available for reaction. The molar ratio of phosphine to olefinic feed stock should be at least about 0.1 and may be as high as 5, or even more. Ordinarily, a molar excess of phosphine with respect to the olefinic charging stock is employed and a preferred molar range of phosphine to olefin charging stock is about 2 to about 10 in order to obtain a relatively high rate of reaction and a high yield of organic phosphine in one operation. Although the phosphine-olefin reaction can be made to proceed even at atmospheric pressure, ordinarily it is desirable to maintain a partial pressure of phosphine in the reaction zone of at least about 10 atmospheres, preferably between about 20 and about 100 atmospheres.

The reaction temperature will ordinarily be selected within the range of about 0 to about 250° C., it being understood that optimum temperatures will vary somewhat with the particular olefinic charging stock, catalyst, phosphine partial pressure, sufficiently of contacting, time and other reaction variables. In general, higher reaction rates are obtained with increasing temperature.

As has been pointed out above, it is ordinarily desirable to operate with a superatmospheric partial pressure of phosphine in the reaction zone. This pressure is augmented to some extent by the partial pressure under the reaction conditions of the olefinic charging stock and may be further increased, if desired, by pressuring the reaction zone to the desired extent with a volatile solvent or diluent and/or a gas which is inert under the reaction conditions, e. g., nitrogen, methane, carbon dioxide, etc. At very high pressures, e. g. about 350 to about 1000 atmospheres, a telomerization reaction can occur in which the product appears to be an adduct of phosphine and olefin polymer, e. g. a polyethylene. Highly reactive olefins can telomerize under relatively milder operating conditions. The olefinic charging stock is usually maintained, at least in part, as a liquid phase in the reaction zone, although both the olefinic charging stock and phosphine may be present in the reaction zone as vapors or as gases under high pressure.

The molar ratio of acid catalyst to olefinic charging stock may vary between about 0.1 and 10 or more mols, for example 20 mols. It will be understood that the effects of temperature, as well as of phosphine concentration and catalyst concentration, relative to the amount of olefinic charging stock, are all interdependent variables. As a result of the relationship of these variables, lower catalyst concentrations can be employed with higher temperatures and/or phosphine concentrations to obtain reaction rates and yields similar to those following upon the use of lower reaction temperatures and/or phosphine concentrations in combination with higher catalyst concentrations, relative to the olefinic charging stock.

The organic phosphines produced by the present process, particularly the monoalkylphosphines, are weakly basic materials and form thermally dissociable phosphonium salts with the acid catalyst employed. As a consequence, at higher reaction temperatures more free acid is available to catalyze the reaction than at low temperatures, at which the degree of dissociation of the phosphonium salts is relatively low. Thus, in 16 hours run employing 2.8 mols phosphine per 1.0 mol of propylene tetramer per 0.1 mol of methanesulfonic acid catalyst at 30° C., 60° C. and 85° C., the dodecyl phosphine yields were 24, 56 and 67 mol percent, respectively, based on the olefin feed. The reactions involved are sufficiently rapid to be complete in about 8 hours and therefore the yield data represent not so much the increase in rate of reaction due to increasing operating temperatures, but, more accurately, indicate the effect of temperature on salt formation between the basic phosphine product and the acid catalyst. At 30° C., the 2.4/1 mol ratio of alkylphosphine to methanesulfonic acid was sufficient substantially to deactivate the catalyst. At 85° C., the dissociation tendency of the dodecylphosphonium methanesulfonate is considerably greater and the catalyst was not effectively deactivated until almost seven mols of dodecylphosphine per mol of catalyst were present.

Ordinarily the olefin-phosphine reactions can be carried to equilibrium in about ½ to about 4 hours.

If desired, the reaction can be effected in the presence of inert solvents, such as saturated, normally liquid hydrocarbons. However, the present reaction will proceed in the absence of inert solvents.

The present process may be carried out batchwise, continuously or semi-continuously. The present process may also be effected in a number of stages with or without product separation between stages. The particular reaction equipment employed forms no part of the present invention and, therefore, need not be set forth in detail. For example, the present process can be carried out in conventional reaction kettles or autoclaves or in the type of reaction equipment heretofore employed in the petroleum industry in effecting the alkylation of aromatic or isoparaffinic hydrocarbons with normally gaseous olefins in the presence of liquid acidic alkylation catalysts.

The following operating examples are included to specifically illustrate the present invention without the intention of unnecessarily limiting the same. The examples were carried out in a stainless steel, magnetically-stirred autoclave having a capacity of 100 ml.

Four different procedures of charging the autoclave were employed as indicated in the following tabulation:

CHARGING PROCEDURE

| A | B | C | D |
| --- | --- | --- | --- |
| Catalyst added | Catalyst added | Olefin added | Olefin added |
| Cooled to −80° C.; Evacuated. | Olefin added | Cooled to −80° C.; Evacuated. | Cooled to −80° C.; Evacuated. |
| Olefin added | Cooled to −80° C.; Evacuated. | Phosphine added | Phosphine added. |
| Phosphine added | Phosphine added | Catalyst added | Heated to reaction temp. |
| Heated to reaction temp. | Heated to reaction temp. | Heated to reaction temp. | Catalyst added. |

Procedure A was employed in some runs in which the catalyst employed was fairly active but could not be easily charged through small pressure fittings. Charging procedure B was employed with solid catalysts and other low activity catalysts. Charging procedure C was employed with active liquid catalysts and readily polymerizable olefins or when the effects of the order of catalyst addition and temperature or pressure were not of interest.

With isobutylene, propylene, and ethylene feed stocks, procedure C or D was used except that heptane was first charged, and the olefin charged to the autoclave after cooling and evacuation. The cooling to Dry Ice temperature served both to inactivate the catalyst (if present) before adding the olefin and to facilitate charging of the phosphine. In all procedures the phosphine was always present before the catalyst was added or reached a temperature at which it was active. This was done to minimize the possibility of olefin polymerization.

In all cases the reaction vessel was thoroughly flushed with nitrogen and evacuated before adding the phosphine, which can ignite spontaneously in certain concentrations with oxygen. The phosphine was measured into the charging bomb by wet meter and the amount remaining after charging to the reaction vessel by gauge pressure. Excessively long reaction periods were deliberately selected to insure a high degree of completion of the various reactions.

When the reaction was terminated, the excess phosphine was vented to atmospheric pressure and the bomb thoroughly flushed with nitrogen, emptied, and washed with heptane. The heptane phase was then washed with water to remove the catalyst, leaving a heptane solution of alkylphosphine and unreacted olefin. All the above operations were carried out under an atmosphere of nitrogen to prevent oxidation of the alkylphosphine by atmospheric oxygen. The yield of alkylphosphine was determined analytically by oxidizing an aliquot of the reaction product solution with hydrogen peroxide (to yield phosphorus-containing acids) and determining the phosphorus content by titration and/or elementary analysis.

The products obtained under the conditions employed are monoalkylphosphines containing less than about 10 weight percent of dialkylphosphines and no trialkylphosphines. The reaction products can be explained on the basis of a carbonium ion reaction mechanism.

TABLE 1

Alkylation of Phosphine

| Example No. | Olefin | Mol Ratio $PH_3$:Olefin: Catalyst | Charging Method | Time, Hours | Temp., °C. | Press., p. s. i. g. | Per Cent of Theoretical Yield of $RPH_2$ | Remarks |
|---|---|---|---|---|---|---|---|---|
| 1 | Ethylene | 3.6:1:1 | C | 16 | 60 | 1200 | 14 | Heptane solvent. |
| 2 | Propylene | 3.3:1:1 | D | 16 | 80 | 570 | 20 | Heptane solvent. |
| 3 | Dodecene-1 | 2.6:1:1 | A | 16 | 90 | 620 | 28 |  |
| 4 | Isobutylene | 2.9:1:1 | D | 3 | 60 | 500 | 48 | Heptane solvent. |
| 5 | 2-Ethylhexene | 4.2:1:1 | D | 16 | 60 | 650 | 76 |  |
| 6 | Propylene tetramer | 4.3:1:1 | A | 16 | 60 | 700 | 90 | About 85% of tertiary olefin structure in feed. |
| 7 | Polybutylenes | 3.8:1:1 | A | 16 | 60 | 480 | 70 | Heptane solvent. Feed is mostly t-$C_{12}H_{24}$. |
| 8 | Polybutylenes | 20:1:10 | A | 16 | 95 | 750 | 81 | Heptane solvent. Feed is mostly t-$C_{16}H_{32}$. |
| 9 | 4-Methylcyclohexene | 1.8:1:0.5 | D | 16 | 60 | 520 | 34 | Product is t-methylcyclohexyl phosphine. |
| 10 | 1-Methylcyclopentene | 1.8:1:0.5 | C | 16 | 60 | 455 | 41 |  |
| 11 | Limonene | 5:1:2 | C | 17 | 85–90 | 720 | 75 | Polymeric phosphine product. |
| 12 | Isoprene | 6.4:1:1 | C | 16 | 60 | 600 | 66 | Heptane solvent. |
| 13 | Styrene | 3:1:0.6 | C | 3 | 60 | 570 | 44 | Polymeric phosphine product. |
| 14 | B-neopentyl allyl chloride | 2.4:1:1 | D | 16 | 60 | 530 | 21 | Partial decomposition of feed. |

Table 1 is essentially self-explanatory and presents primarily information showing the rather broad and general applicability of the present reaction to various olefinic charging stocks. The catalyst employed was methanesulfonic acid, except in Example 1, in which a mixture of methanesulfonic acid and $BF_3$ containing 15 weight percent $BF_3$ was employed. It will be noted from Table 1 that the reaction has been successfully applied to ethylene, secondary olefins, tertiary olefins, cyclo-olefins, polyolefins and, in Example 14, to a chloro-olefin. The yields are good for the most part, although in the experiments set forth in Table 1 no special efforts were devoted to obtaining optimum operating conditions. With such charging stocks as the polypropylenes and polybutylenes, the reported yields indicate a very high percentage of selective reaction of the tertiary olefins contained in the charging stocks. It has also been observed that the reaction rate of propylene tetramer falls off markedly after the tertiary olefin content thereof has reacted with phosphine. The 4-methylcyclohexene charging stock of Example 9 appears to have isomerized during the conversion, since the product was t-methylcyclohexyl phosphine. It will be noted from Table 1 that the reaction is applicable to the lowest molecular weight olefin as well as to very high molecular weight ($C_{65}$) olefins.

In Example 5, wherein 2-ethylhexene was employed as the charging stock, the reaction mixture was distilled to yield a water-white mobile liquid boiling at about 170° C. at atmospheric pressure. The phosphines produced in several runs employing propylene tetramer as charging stock were oxidized to yield products which were identified by both elementary phosphorus analysis and potentiometric titration as

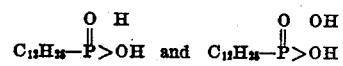

In Examples 11 and 13 the reaction products were apparently telomers, i. e. products derived from phosphine and a polymer of the olefinic feed stock.

TABLE 2

| Example No. | Olefin | Catalyst | Mol Ratio PH₃:Olefin:Catalyst | Time, Hours | Temp., °C. | Press., p. s. i. g. | Per cent of Theoretical Yield of RPH₂ | Remarks |
|---|---|---|---|---|---|---|---|---|
| 7 | Propylene tetramer | Methanesulfonic acid | 4.3:1:1 | 16 | 60 | 700 | 90 | Mostly tertiary olefin structure in feed. |
| 15 | ....do.... | Mixed (C₁-C₄) alkanesulfonic acids. | 2.7:1:1 | 17 | 60 | 550 | 81 | |
| 16 | ....do.... | Benzenesulfonic acid | 2.4:1:0.5 | 3 | 60 | 540 | 72 | |
| 9 | Polybutylenes | Methanesulfonic acid | 20:1:10 | 16 | 95 | 750 | 81 | Heptane solvent. Feed is mostly t-C₆₅H₁₃₀. |
| 17 | ....do.... | Ethanesulfonic acid | 18:1:10 | 17 | 95 | 580 | 73 | .02 mols olefin +30 ml. heptane. Feed is mostly t-C₆₅H₁₃₀. |
| 18 | Propylene tetramer | Hydrogen fluoride | 3.7:1:1 | 3 | 30 | 430 | 53 | |
| 19 | ....do.... | Trifluoroacetic acid | 3.7:1:1 | 3 | 60 | 560 | 60 | |
| 20 | ....do.... | Boron trifluoride etherate. | 3.6:1:0.8 | 3 | 30 | 390 | 30 | |
| 21 | ....do.... | 85% Phosphoric acid | 2.2:1:1 | 17 | 60 | 580 | 2 | |
| 22 | ....do.... | 85% Phosphoric acid +P₂O₅. | 3.8:1:1 | 3 | 60 | 665 | 17 | |
| 23 | ....do.... | Hydrogen iodide (charged as PH₄I). | 3.6:1:1 | 3 | 95 | 910 | 5.6 | Alkyl iodide formed. |
| 24 | ....do.... | Aluminum bromide (Sat. heptane solution). | 3.7:1:0.07 | 3 | 60 | 560 | 4.6 | Aluminum phosphide formed. |
| 25 | ....do.... | Oxalic acid (anhyd.) | 2.6:1:0.8 | 3 | 90 | 660 | 1.5 | |
| 26 | ....do.... | Filtrol SR¹ | 3.6:1:— | 3 | 80 | 725 | 1 | |
| 27 | ....do.... | Conc. sulfuric acid | 2.9:1:0.1 | 15 | 30 | 350 | 0 | Catalyst was reduced by phosphine. |
| 28 | 2-Ethylhexene | Product acid $\left(\begin{array}{c} C_8-P=O \\ | \phantom{xx} \backslash \\ H \phantom{x} OH \end{array}\right)$ | 2.8:1:0.3 | 15 | 80-85 | 650 | 11 | |

¹ A commercial cracking catalyst having the composition 40 w. per cent Al₂O₃ and 59 w. per cent SiO₂; 25 g. catalyst used with 0.2 mol olefin and 0.75 mol phosphine.

Table 2 presents experimental data obtained concerning the employment of various acids as catalysts in the present olefin-phosphine reaction. From Table 2 it will be apparent that, in general, non-oxidizing strong acid catalysts are useful for the present purposes. Of demonstrable and special value are the hydrocarbon sulfonic acids and fluorine-containing strong acid catalysts such as hydrogen fluoride and trifluoroacetic acid; also suitable for inclusion in this category is BF₃-etherate. Phosphoric acid in the concentration of 85 percent exhibited relatively low activity (Example 21) which could be substantially increased through increasing the acid strength by fortification with P₂O₅ (Example 22). It will be noted that relatively weak acids such as oxalic and aluminosilicic (Examples 25 and 26) exhibited only a slight catalytic effect. Concentrated sulfuric acid (Example 27) was reduced by the phosphine and no organic phosphine was produced from the olefin. Example 28 is of interest in that the phosphine product from one run was oxidized to the alkanephosphinic acid which then proved to be a moderately active catalyst in another run employing the same charging stock.

As will be apparent from the foregoing tabulation of examples, the application of the process of the present invention to tertiary olefins has yielded novel chemical compounds, viz. mono-t-alkylphosphines, viz., mono-t-butylphosphine, mono-t-ethylhexylphosphine, mono-t-dodecylphosphine (from a tertiary propylene tetramer).

Although the foregoing examples have illustrated reactions effected at substantial superatmospheric pressure, the novel reactions of the present invention can be effected even at atmospheric pressure, as will be illustrated by the following examples.

Example 29

The reaction was carried out in a 200 ml. flask fitted with a stirrer, a sintered glass bubbling tube for introducing phosphine, and a gas outlet tube. The reactor was placed in a water bath maintained at 20-25° C. The flask was flushed with nitrogen, 50 ml. (0.77 mol) of methanesulfonic acid was charged, a phosphine stream was started through the reactor, and finally, 77 ml. (0.50 mol) of 2-ethylhexene were charged to the reactor. In the course of 20 hours, 21 liters of phosphine were bubbled at atmospheric pressure through the reaction mixture, 17 liters in the first four hours, and the remainder in the last 16 hours. A total of about 4.8 liters was absorbed. The reaction mixture was flushed with nitrogen and washed with aqueous NaOH to remove the catalyst. A sample of the crude product was oxidized and the resulting phosphorus-containing acids titrated. A yield of 0.114 mol of alkylphosphine corresponding to a 23 percent yield of mono-tert-octylphosphine, based on olefin, was obtained.

Example 30

Into a 1 liter 3-necked flask fitted with a stirrer, gas inlet and outlet tubes, and a dropping funnel, there were charged 154 ml. (1.0 mol) of 2-ethylhexene and 350 ml. of heptane. This solution was then cooled to Dry Ice temperature and phosphine bubbled in until 0.67 mol dissolved. One mol of BF₃-ethyl etherate was then added with stirring over the course of 45 minutes. The reaction mixture was held at Dry Ice temperature for 64 hours, allowed to warm to room temperature, and then washed free of the catalyst. Oxidation and titration of a sample of the crude product solution indicated a 20.2 percent yield of mono-tert-octylphosphine. Another portion of the crude reaction mixture was oxidized and the acid formed was isolated as the sodium salt. This was shown both by phosphorus analysis and potentiometric titration to comprise substantially a sodium octylphosphinate

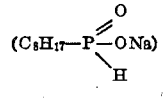

Example 31

A 1 liter 3-necked flask fitted with a stirrer, gas inlet and outlet tubes, and a liquid addition tube was used. One-half mol (77 ml.) of 2-ethylhexene and 700 ml. of heptane were charged and saturated with phosphine (0.153 mol) at room temperature. Phosphine was then bubbled through the solution at atmospheric pressure at the rate of about 6 liters per hours for about 2 hours. During this time 50 ml. (0.77 mol) of methanesulfonic acid were added dropwise to the stirred reaction mixture. An additional 0.23 mol of phosphine was absorbed during the period. The heptane solution was then washed with alkali to remove the acid catalyst. Titration of an oxidized sample of the crude product solution indicated that a yield of 25.6 percent (based on olefin) of mono-tert-octylphosphine had been obtained.

The organic phosphines produced by the present process can be purified by various methods which are known in the art. Small proportions of dialkyl phosphine can be removed from the monoalkyl phosphine by washing with dilute acid, in which only the dialkyl phosphine is soluble.

As has been mentioned above, the acid-catalyzed reaction of an olefin and phosphine to form an alkyl phosphine appears to proceed through a carbonium ion formed by the addition of a proton to the olefin. Moreover, the acid-catalyzed reaction produces principally monoalkyl phosphines. However, free radical-forming agents such as ultraviolet light, peroxides or active azo compounds of the type of diazoisobutyronitrile and diazothioethers induce the reaction of phosphine with olefins to yield principally trialkyl phosphines accompanied by minor proportions of mono- and dialkyl phosphines. Thus, 1-octene reacts with phosphine in a quartz vessel under ultraviolet irradiation at 25° C. and atmospheric pressure to form trioctylphosphine in about 14 percent yield, together with about 3 percent of mono- and di-octylphosphines. The free radical initiated reaction of phosphine with an olefin is described and claimed in my application for Letters Patent Serial No. 253,751, filed October 29, 1951, which is a continuation-in-part of the present application.

Air, oxygen, nitrogen dioxide, and hydrogen peroxide have all been tested for the oxidation of alkylphosphines. Monoalkylphosphines react extremely vigorously with oxygen to yield a mixture of phosphoric, alkanephosphinic and alkanephosphonic acids (nomenclature based on C. A. 39, 5939, section 38 (1945)) of which the phosphoric acid comprises about 30 percent. That the formation of phosphoric acid was not due to impurities such as dissolved phosphine was demonstrated by oxidation of a sample of distilled alkylphosphine. The same products were obtained. In experiments where only 35 percent and 70 percent of the total oxygen were added, the ratios of phosphoric acid to phosphinic and phosphonic acids were the same as in complete oxidation. It appears that the phosphoric acid forms simultaneously with the alkanephosphinic acid and that the oxidation of the alkyl phosphine may proceed by several paths to yield these different products.

Oxidation of alkylphosphines with oxygen takes place at temperatures as low as −50° C., is relatively unaffected by dilution (air can be used), and is not significantly altered by the presence of water or aqueous sodium hydroxide. These factors decrease the amount of oxidation but do not substantially alter the composition of the product. The reaction appears to proceed by a chain mechanism and yields, in addition to phosphoric acid, a mixture comprising 80–85 weight percent alkanephosphinic acid and 20–15 weight percent alkanephosphonic acid.

Nitrogen dioxide reacts readily with alkylphosphines at room temperature to produce a mixture comprising about 30 weight percent alkanephosphonic acid and 60 weight percent alkanephosphinic acid. Only about 9 percent of the alkylphosphine is converted to phosphoric acid by $NO_2$, as compared to about 30 percent with oxygen. The nitric oxide evolved during the oxidation may be readily converted to nitrogen dioxide by contact with air and recycled. The acids obtained by nitrogen dioxide oxidation contain some unidentified nitrogen compounds as impurities. These probably arise from the addition of nitric oxide and nitrogen dioxide to unreacted olefin present in the reaction mixture.

Hydrogen peroxide (30 percent) at 50° C. functions like nitrogen dioxide at 25° C. forming only about 10 weight percent phosphoric acid from alkylphosphines. The proportion of phosphinic acid converted to phosphonic acid is lower.

Comparative data for the oxidation of t-dodecylphosphine (propylene tetramer-phosphine adduct) are shown in Table 3.

TABLE 3

| | | Oxidation of Tertiary Dodecylphosphine Product Composition, Wt. Per Cent | | |
|---|---|---|---|---|
| Oxidizing Agent | Temp., °C. | $H_3PO_4$ | $R-\overset{O}{\underset{H}{P}}-OH$ | $R-\overset{O}{P}-(OH)_2$ |
| $O_2$ | 25 | 33 | 56 | 11 |
| $NO_2$ | 25 | 9 | 65 | 26 |
| 30% $H_2O_2$ | 50 | 10 | 77 | 13 |

The oxidation of t-dodecanephosphinic acid with concentrated nitric acid at 80–100° C. proceeds smoothly to give 90 percent or better yields of t-dodecanephosphonic acid.

Hydrogen peroxide at 80–100° C. does not readily effect the oxidation of alkanephosphinic to alkanephosphonic acid. The use of acetic acid as a solvent and molybdenum oxide as a promoter is beneficial.

The monoalkyl phosphines may be treated with formaldehyde in the presence of basic catalysts to produce polyhydroxy compounds which are useful as emulsifiers and detergents, or with ethylene oxide to form similar products, thus:

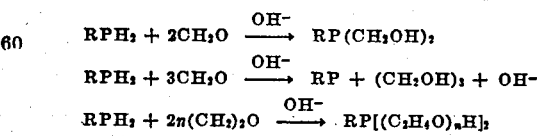

The monoalkylphosphines may be treated with alkyl halides, such as methyl chloride, to form quaternary phosphonium halides. Certain phosphonium compounds are interesting detergents of the cationic type, useful for the formulation of fungicides, insecticides, weed killers, etc.

The mixed t-octanephosphinic and phosphonic acids are excellent additives for use in asphalts employed with wet aggregates.

Having thus described my invention, what I claim is:

1. A process for producing an organic phosphine which comprises contacting an olefin with phosphine and a strong non-oxidizing acid catalyst under reaction conditions of temperature and pressure.

2. A process for producing an organic phosphine which comprises contacting an olefin with at least an equimolar proportion of phosphine and with a strong non-oxidizing acid catalyst under reaction conditions of temperature and pressure.

3. A process for producing an organic phosphine which comprises contacting a monoolefinic hydrocarbon with phosphine and a strong non-oxidizing acid catalyst under reaction conditions of temperature and pressure.

4. The process of claim 3 wherein the catalyst is a non-oxidizing strong liquid acid catalyst.

5. The process of claim 3 wherein the catalyst is a non-oxidizing liquid mineral acid catalyst.

6. The process of claim 3 wherein the catalyst is a non-oxidizing strong organic acid catalyst.

7. The process of claim 3 wherein the catalyst is a hydrocarbon sulfonic acid.

8. The process of claim 3 wherein the catalyst is hydrogen fluoride.

9. The process of claim 3 wherein the catalyst is trifluoroacetic acid.

10. A process for producing an alkylphosphine, which process comprises contacting an olefinic hydrocarbon with at least about an equimolar proportion of phosphine at a reaction temperature between about 0° C. and about 250° C. and with at least about 0.1 mol, per mol of said olefinic hydrocarbon, of a strong non-oxidizing acid catalyst.

11. The process of claim 10 wherein said catalyst is a strong non-oxidizing liquid catalyst.

12. The process of claim 10 wherein the catalyst is a hydrocarbon sulfonic acid.

13. The process of claim 10 wherein the catalyst is hydrogen fluoride.

14. The process of claim 10 wherein the catalyst is trifluoroacetic acid.

15. A process for effecting selective reaction of a tertiary olefin in a mixture thereof with another olefin, which process comprises contacting said mixture with phosphine and at least about 0.1 mol, per mol of tertiary olefin in said mixture, of a strong non-oxidizing acid catalyst at a reaction temperature between about 0° C. and about 250° C.

16. A mono-t-alkylphosphine.

17. Mono-t-butylphosphine.

18. Mono-t-ethylhexylphosphine.

19. Mono-t-dodecylphosphine.

HERBERT C. BROWN

No references cited.